(12) United States Patent
Mok et al.

(10) Patent No.: US 10,807,046 B2
(45) Date of Patent: Oct. 20, 2020

(54) ASYMMETRIC ARTICLES WITH A POROUS SUBSTRATE AND A POLYMERIC COATING EXTENDING INTO THE SUBSTRATE AND METHODS OF MAKING THE SAME

(71) Applicant: 3M INNOVATIVE PROPERTIES COMPANY, St. Paul, MN (US)

(72) Inventors: Michelle M. Mok, St. Paul, MN (US); Kannan Seshadri, Woodbury, MN (US); Moses M. David, Woodbury, MN (US); Seth M. Kirk, Minneapolis, MN (US); Daniel Carvajal, Edina, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 515 days.

(21) Appl. No.: 15/319,111

(22) PCT Filed: Jun. 30, 2015

(86) PCT No.: PCT/US2015/038442
§ 371 (c)(1),
(2) Date: Dec. 15, 2016

(87) PCT Pub. No.: WO2016/003976
PCT Pub. Date: Jan. 7, 2016

(65) Prior Publication Data
US 2017/0144111 A1    May 25, 2017

Related U.S. Application Data

(60) Provisional application No. 62/018,850, filed on Jun. 30, 2014.

(51) Int. Cl.
*B01D 67/00* (2006.01)
*B01D 69/10* (2006.01)
(Continued)

(52) U.S. Cl.
CPC ......... *B01D 69/127* (2013.01); *B01D 67/009* (2013.01); *B01D 67/0086* (2013.01);
(Continued)

(58) Field of Classification Search
CPC ................ B01D 69/127; B01D 69/105; B01D 67/0086; B01D 67/009; B01D 67/0088;
(Continued)

(56) References Cited

U.S. PATENT DOCUMENTS 3,880,966 A    4/1975 Zimmerman
4,163,725 A    8/1979 Sano
(Continued)

FOREIGN PATENT DOCUMENTS

CN        1817427              8/2006
EP        0242069 A2 * 10/1987 ............ A61L 15/26
(Continued)

OTHER PUBLICATIONS

Kang, M., et al, "Surface modification of polypropylene membrane by low-temperature plasma treatment", Journal of Applied Polymer Science, vol. 81, pp. 1555-1566 (2001).*
(Continued)

*Primary Examiner* — Benjamin L Lebron
(74) *Attorney, Agent, or Firm* — Adrian L. Pishko

(57) ABSTRACT

Asymmetric articles are described including a porous substrate with two opposing major surfaces and a porous structure extending between the surfaces, and a polymeric coating on one of the major surfaces and extending into the porous structure to a depth of the porous structure. Methods for making an asymmetric composite article are also provided, including providing a porous substrate, treating the porous substrate with a plasma treatment or a corona treatment from one major surface to a depth of the porous structure between the two major surfaces. The method (Continued)

further includes applying a coating solution to the treated porous substrate and drying the coating solution to form a composite asymmetric composite article having a polymeric coating on one major surface and extending into the porous structure to the depth of the treated porous structure.

8 Claims, 8 Drawing Sheets

(51) Int. Cl.
   B01D 69/12    (2006.01)
   B01D 71/26    (2006.01)
   B01D 71/32    (2006.01)
   B01D 71/44    (2006.01)
   B01D 71/70    (2006.01)
   B01D 71/42    (2006.01)

(52) U.S. Cl.
   CPC .......... B01D 69/105 (2013.01); B01D 71/26 (2013.01); B01D 71/32 (2013.01); B01D 71/44 (2013.01); B01D 71/70 (2013.01); B01D 71/42 (2013.01); B01D 2323/34 (2013.01)

(58) Field of Classification Search
   CPC .... B01D 67/0093; B01D 71/44; B01D 71/70; B01D 71/26; B01D 2323/34; B01D 71/32; B01D 71/42
   See application file for complete search history.

(56) References Cited

U.S. PATENT DOCUMENTS

| | | | |
|---|---|---|---|
| 4,539,256 A | 9/1985 | Shipman | |
| 4,623,670 A | 11/1986 | Mutoh | |
| 4,702,836 A | 10/1987 | Mutoh | |
| 4,726,989 A | 2/1988 | Mrozinski | |
| 5,120,594 A | 6/1992 | Mrozinski | |
| 5,147,549 A * | 9/1992 | Chou | B01D 61/362 210/500.27 |
| 5,160,353 A | 11/1992 | Gochanour | |
| 5,238,623 A | 8/1993 | Mrozinski | |
| 5,792,517 A | 8/1998 | Takeuchi | |
| 5,843,789 A * | 12/1998 | Nomura | B01D 69/127 436/164 |
| 5,972,176 A | 10/1999 | Kirk | |
| 5,993,954 A | 11/1999 | Radovanovic | |
| 6,118,218 A | 9/2000 | Yializis | |
| 6,559,192 B2 | 5/2003 | Maccone | |
| 6,632,850 B2 | 10/2003 | Hughes | |
| 6,878,419 B2 | 4/2005 | David | |
| 7,125,603 B2 | 10/2006 | David | |
| 7,140,495 B2 | 11/2006 | Hester | |
| 7,247,238 B2 | 7/2007 | Mullette | |
| 7,615,105 B2 | 11/2009 | Odaka | |
| 8,445,076 B2 | 5/2013 | Cohen | |
| 2004/0185242 A1 | 9/2004 | Charkoudian | |
| 2007/0209425 A1 * | 9/2007 | Shibata | B01D 65/10 73/40 |
| 2009/0280382 A1 | 11/2009 | MacKinnon | |
| 2011/0100220 A1 | 5/2011 | David | |
| 2011/0165497 A1 | 7/2011 | MacKinnon | |
| 2011/0244013 A1 | 10/2011 | Mrozinski | |
| 2012/0043274 A1 * | 2/2012 | Chi | B01D 67/0006 210/490 |
| 2012/0165420 A1 * | 6/2012 | Bhikhi | B01D 67/0006 521/27 |
| 2013/0143146 A1 | 6/2013 | Huang | |
| 2013/0256229 A1 | 10/2013 | Wang | |
| 2014/0345462 A1 | 11/2014 | Itou | |
| 2015/0231575 A1 * | 8/2015 | Starostine | H01J 37/32045 216/56 |

FOREIGN PATENT DOCUMENTS

| | | |
|---|---|---|
| WO | WO 02/46282 | 6/2002 |
| WO | WO 2007/070688 | 6/2007 |
| WO | WO 2010/043684 | 4/2010 |
| WO | WO 2010-071764 | 6/2010 |
| WO | WO 2011/027138 | 3/2011 |
| WO | WO 2013/122151 | 8/2013 |
| WO | WO 2014/029963 | 2/2014 |

OTHER PUBLICATIONS

Kim, E., et al., "Preparation and characterization of polyamide thin-film composite (TFC) membranes on plasma-modified polyvinylidene fluoride (PVDF)", Journal of membrane science, 344, pp. 71-81 (Year: 2009).*

Kim, E., and Baolin, D., "Effect of NH3 plasma on thin-film composite membrane: relationship of membrane and plasma properties", Membrane water treatment, vol. 4, No. 2, pp. 109-126 (Year: 2013).*

Steen, M., et al., "Hydrophilic modification of polymeric membranes by low temperature H20 plasma treatment", Journal of membrane science, 204, pp. 341-357 (Year: 2002).*

Malik, R., et al., "Atmospheric pressure plasma functionalization of dry-spun multi-walled carbon nanotube sheets and its application in CNT-Polyvinyl alcohol (PVA) composites", Mater. Res. Soc. Symp. Proc., 1574. (Year: 2013).*

International Search Report for PCT International Application No. PCT/US2015/038442 dated Sep. 21, 2015, 3 pages.

Extended European Search Report, EP Application No. 15814138.2, dated Nov. 22, 2017, 4 pages.

MilliporeSigma, "Hydrophilic Polymers—Hydrophilic and Polar Polymers," http://www.sigmaaldrich.com/materials-science/material-science-products.html?TablePage=16372116#:~:text=Within%20this%20section%2C%20most%20hydrophilic%20polymers%20are%20grouped.containing%20amine%20groups%20in%20their%20main-%20or%20side-chains, Printed on Jul. 23, 2020, 1 page.

MilliporeSigma, "Wettability Characterization," http://www.emdmillipore.com/US/en/life-science-research/chromatography-sample-preparation/membrane-learning-center/Wettability-Characterization/lp2b.qB.f7IAAAFM20p88eJt.nav, Printed on Jul. 23, 2020, 5 pages.

* cited by examiner

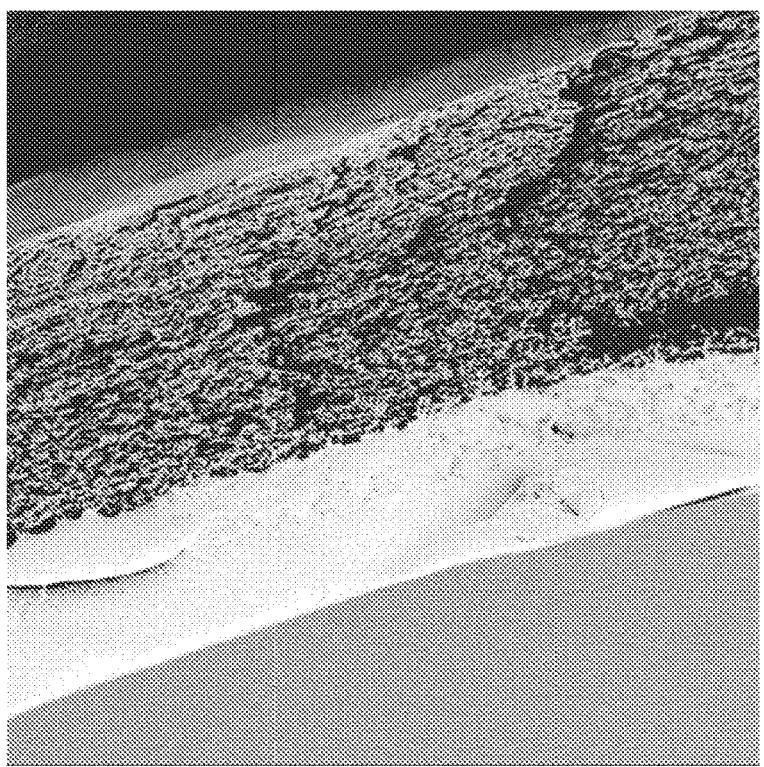
FIG. 2B  100μm
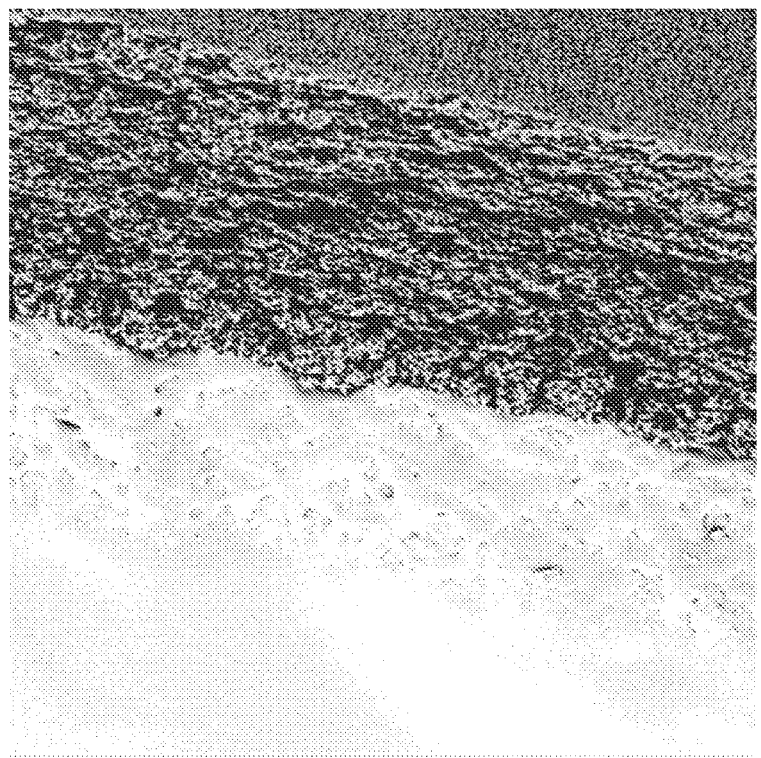
FIG. 2C  60μm

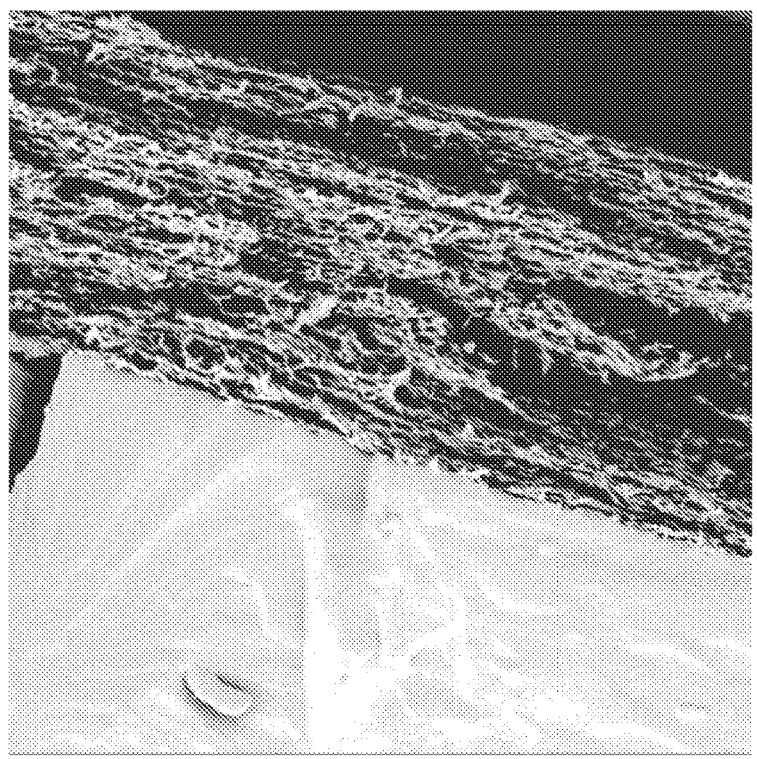
*FIG. 3A* 40μm
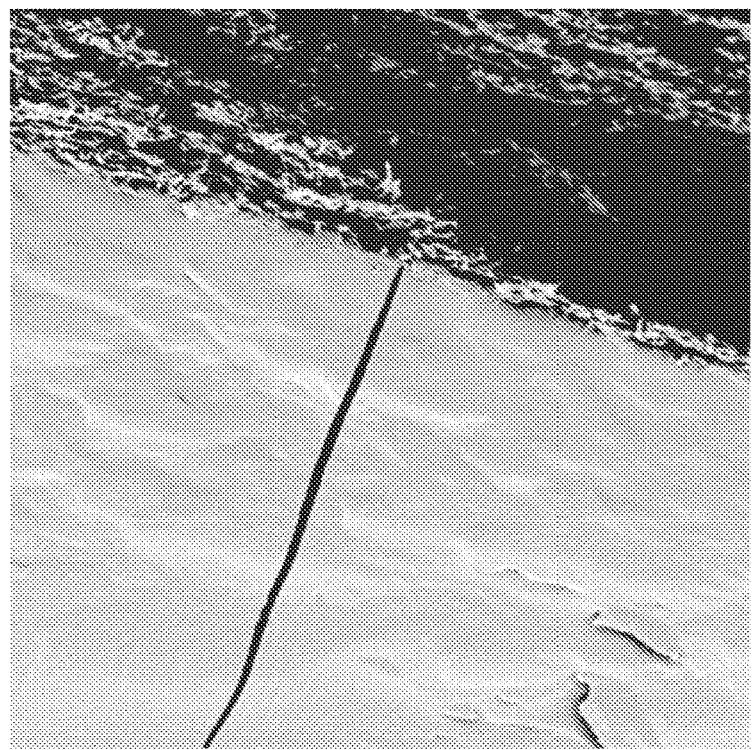
*FIG. 3B* 20μm

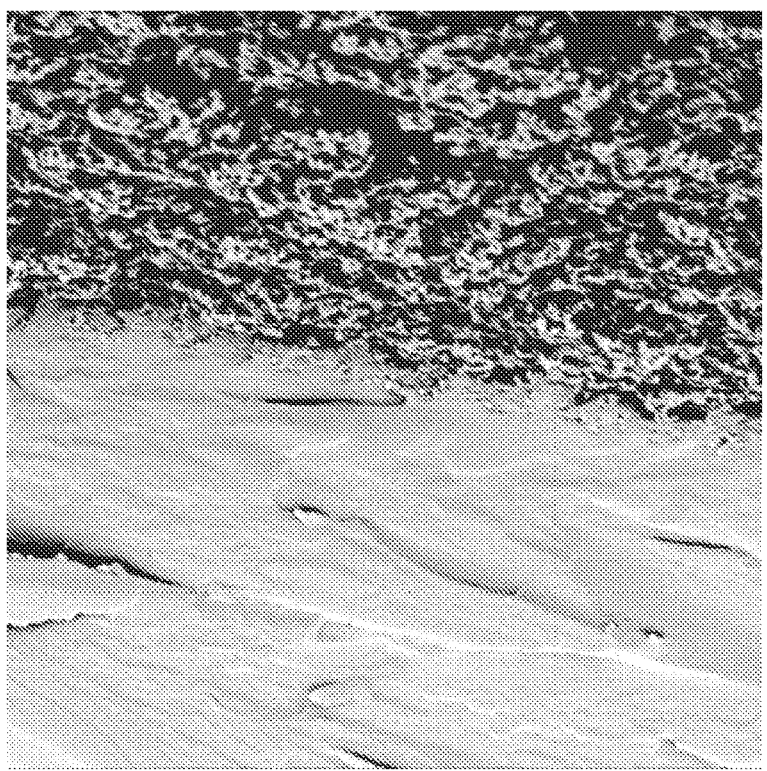
*FIG. 3C*  20μm
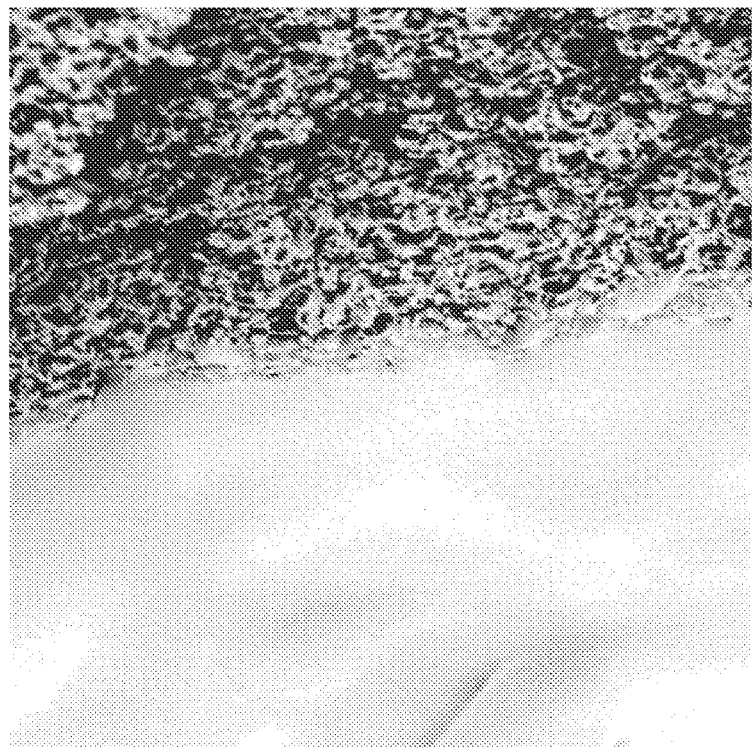
*FIG. 3D*  20μm

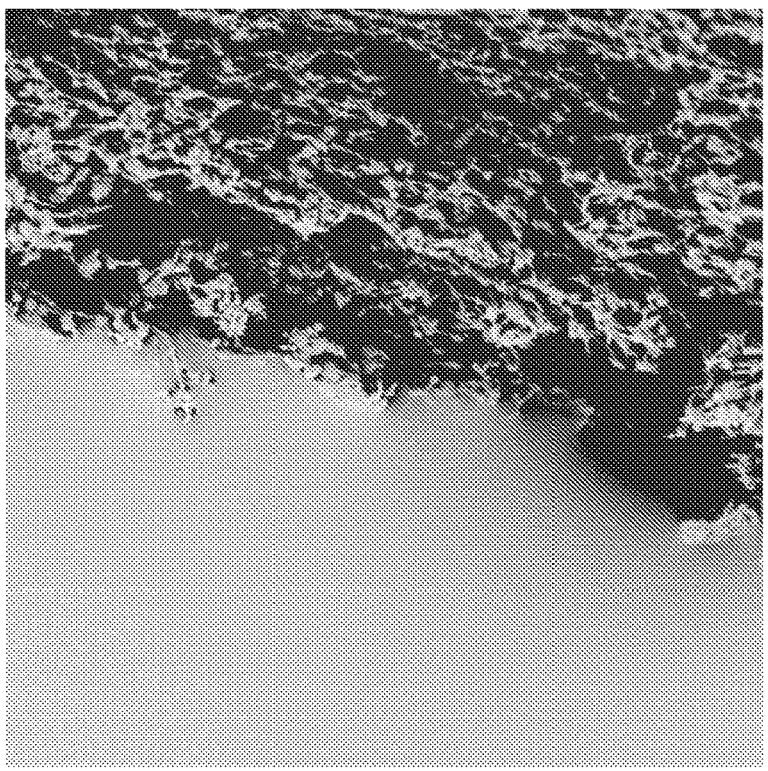
FIG. 4A  20μm
FIG. 4B  20μm

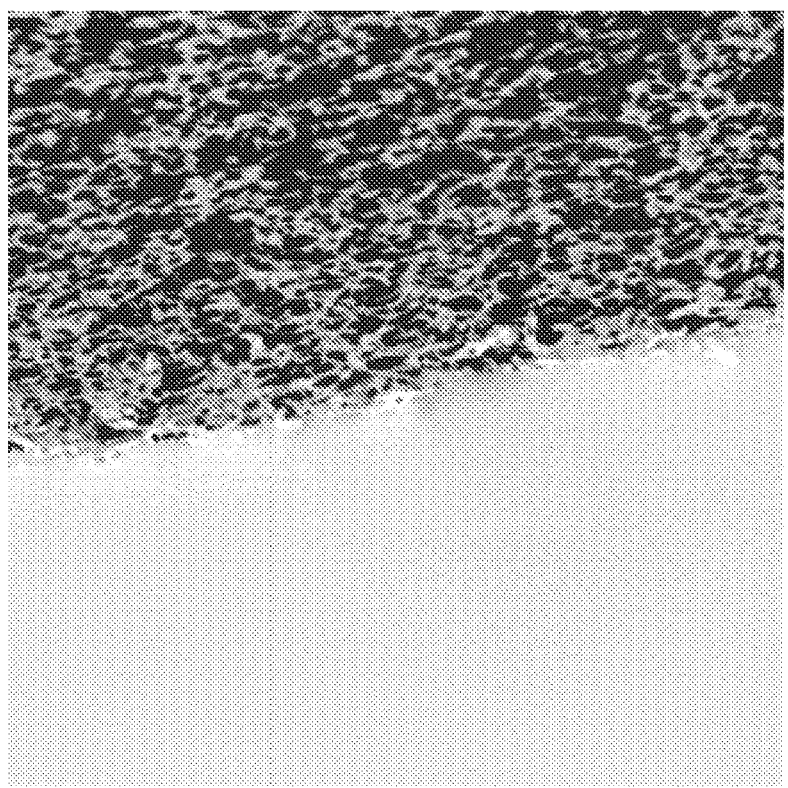
FIG. 4C  20μm
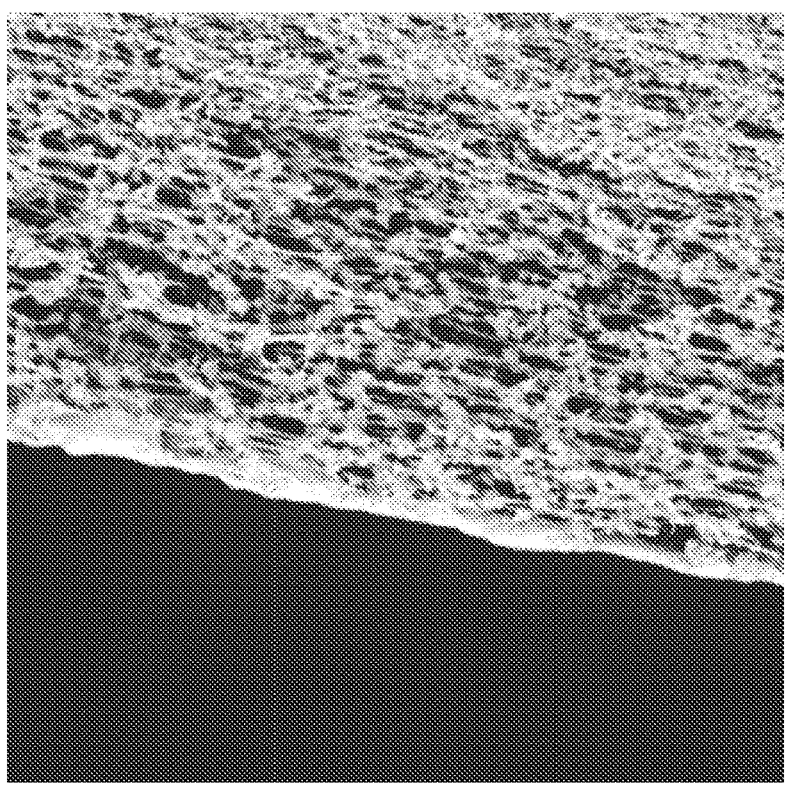
FIG. 5A  30μm

*FIG. 5B*  30μm
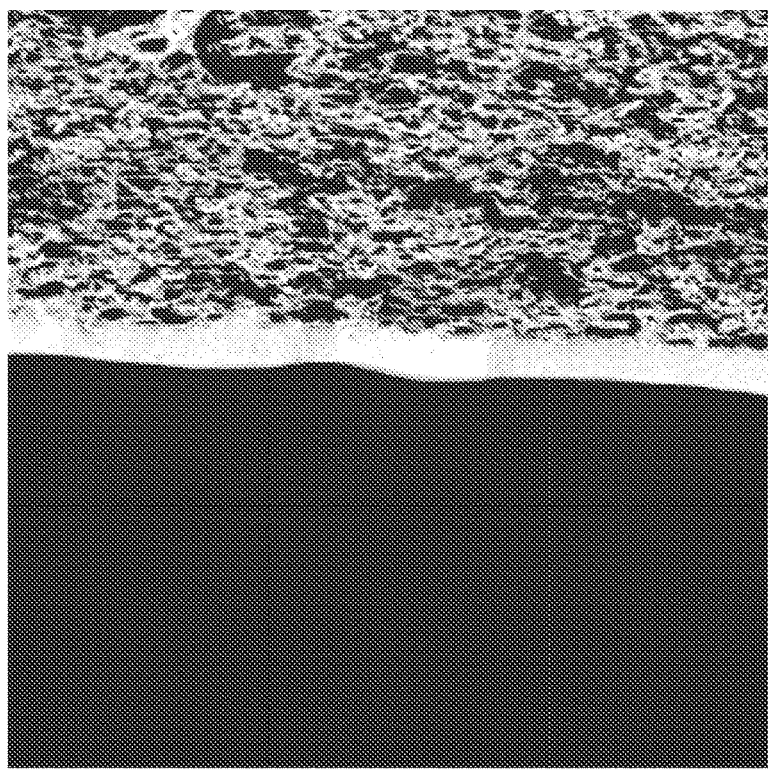
*FIG. 5C*  20μm

ASYMMETRIC ARTICLES WITH A POROUS SUBSTRATE AND A POLYMERIC COATING EXTENDING INTO THE SUBSTRATE AND METHODS OF MAKING THE SAME

CROSS REFERENCE TO RELATED APPLICATIONS

This application is a national stage filing under 35 U.S.C. 371 of PCT/US2015/038442, filed Jun. 30, 2015, which claims the benefit of U.S. Application No. 62/018,850, filed Jun. 30, 2014, the disclosure of which is incorporated by reference in its/their entirety herein.

STATEMENT REGARDING FEDERALLY SPONSORED RESEARCH OR DEVELOPMENT

This invention was made with government support under contract number DE-AR0000098 awarded by the U.S. Department of Energy (DOE). The government has certain rights in the invention.

TECHNICAL FIELD

The present disclosure relates to coated microporous articles and methods of making and using such materials. The disclosure further relates to articles (e.g., sheets, tubes, films, membranes, and the like) having coatings that extend into the articles.

BACKGROUND

Asymmetric articles, such as membranes, generally include a thin selective layer atop a thicker, more porous layer to combine high selectivity with high throughput. Such constructions can be applied, for instance, in water filtration, desalination, gas separations and pervaporation.

One approach to the manufacture of asymmetric membranes is solvent-induced phase inversion, in which the same polymer forms both the selective layer and the underlying macroporous structure. However, this approach may not be feasible in cases where the polymer is expensive or brittle.

Additional approaches to the manufacture of asymmetric articles include generating a selective layer on an existing porous substrate through interfacial polymerization, lamination, or coating. A drawback to interfacial polymerization is that it is applicable in only certain material systems. Lamination can be limited by material properties, plus is not useful for hollow-fiber formats. Coating is more generally applicable; however, the coating solution needs to be wetting towards the substrate material, while still preventing capillary forces from allowing the entire substrate to imbibe the coating material. Typically, this is accomplished by using substrates with nanoscale pore sizes (e.g. <50 nm) in conjunction with high-viscosity coating materials. Such requirements limit the use of more inexpensive macroporous substrates and coating materials with lower viscosity. In some cases, the pores are pre-infiltrated with an immiscible solvent, which requires the availability of such a solvent for the material sets and more complex solvent-handling systems.

Hence, there is a need for asymmetric articles and methods for making the articles.

SUMMARY

Briefly, the present disclosure describes exemplary embodiments of a method for making an asymmetric composite article having both a porous substrate and a polymer coating that extends into the substrate material to a specific depth. In some exemplary methods, these microporous materials can be produced at relatively high rates and low cost. In certain exemplary embodiments, the microporous materials are used to produce articles with advantageous features arising from combination of the microporous material and polymer coating.

Accordingly, in a first aspect, the present disclosure describes a method for making an asymmetric composite article including providing a porous substrate having a first major surface, a second major surface opposing the first major surface, and a porous structure extending therebetween, and treating the porous substrate with a plasma treatment or a corona treatment from the first major surface to a depth of the porous structure between the first major surface and the second major surface. The method further includes applying a coating solution to the treated porous substrate and drying the coating solution to form a composite asymmetric composite article comprising polymeric coating disposed on the first major surface or on the second major surface and extending into the porous structure to the depth of the treated porous structure.

In a second aspect, the present disclosure describes an asymmetric composite article including a porous substrate having a first major surface, a second major surface opposing the first major surface, and a porous structure extending therebetween. The asymmetric composite article further includes a polymeric coating disposed on the first major surface or on the second major surface and extending into the porous structure to a depth of the porous structure.

The articles described herein are important and useful, for example, for the development of asymmetric membranes for water filtration, desalination, gas separations, and pervaporation.

Various aspects and advantages of exemplary embodiments of the disclosure have been summarized. The above Summary is not intended to describe each illustrated embodiment or every implementation of the present disclosure. The Drawings and the Detailed Description that follow more particularly exemplify certain suitable embodiments using the principles disclosed herein.

BRIEF DESCRIPTION OF DRAWINGS

FIG. 2B is an SEM image of a cross-section of dried PVP coating on a plasma-treated polypropylene membrane (Sample 2) at a magnification of 950 times.

FIG. 2C is an SEM image of a cross-section of dried PVP coating on a plasma-treated polypropylene membrane (Sample 3) at a magnification of 1660 times.

FIG. 3A is an SEM image of a cross-section of dried PVP coating on an untreated ethylene chlorotrifluoroethylene (ECTFE) membrane (Sample 4) at a magnification of 2300 times.

FIG. 3B is an SEM image of a cross-section of dried PVP coating on a plasma-treated ECTFE membrane (Sample 5) at a magnification of 3400 times.

FIG. 3C is an SEM image of a cross-section of dried PVP coating on a plasma-treated ECTFE membrane (Sample 6) at a magnification of 3800 times.

FIG. 3D is an SEM image of a cross-section of dried PVP coating on a plasma-treated ECTFE membrane (Sample 7) at a magnification of 3650 times.

FIG. 4A is an SEM image of a cross-section of dried PVP coating on a corona-treated PP membrane (Sample 8) at a magnification of 3650 times.

FIG. 4B is an SEM image of a cross-section of dried PVP coating on a corona-treated ECTFE membrane (Sample 9) at a magnification of 3700 times.

FIG. 4C is an SEM image of a cross-section of dried PVP coating on a corona-treated ECTFE membrane (Sample 10) at a magnification of 3950 times.

FIG. 5A is an SEM image of a cross-section of dried silicone emulsion coating on an untreated PP membrane (Sample 1) at a magnification of 3000 times.

FIG. 5B is an SEM image of a cross-section of dried silicone emulsion coating on a plasma-treated ECTFE membrane (Sample 2) at a magnification of 2900 times.

FIG. 5C is an SEM image of a cross-section of dried silicone emulsion coating on a plasma-treated ECTFE membrane (Sample 4) at a magnification of 3650 times.

Figure 1A:
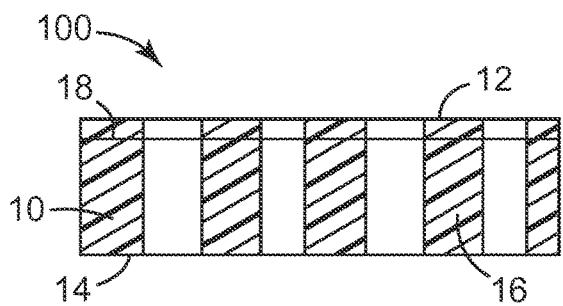
FIG. 1A is a schematic cross-section of an exemplary treated substrate

While the above-identified drawings, which may not be drawn to scale, set forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

Various exemplary embodiments of the disclosure will now be described, with particular reference to the Examples and the Figures. Exemplary embodiments of the disclosure may take on various modifications and alterations without departing from the spirit and scope of the disclosure. Accordingly, it is to be understood that the embodiments of the disclosure are not to be limited to the following described exemplary embodiments, but is to be controlled by the limitations set forth in the claims and any equivalents thereof.

As used throughout this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used throughout this specification and the appended embodiments, the words "suitable" and "preferably" refer to embodiments of the disclosure that may afford certain benefits under certain circumstances. Other embodiments may also be suitable, however, under the same or other circumstances. Furthermore, the recitation of one or more suitable embodiments does not imply that other embodiments are not useful, and is not intended to exclude other embodiments from the scope of the disclosure.

As used throughout this specification and the appended embodiments, the term "comprises" and variations thereof do not have a limiting meaning where these terms appear in the description and claims.

As used throughout this specification and the appended embodiments, the recitation of numerical ranges by endpoints includes all numbers subsumed within that range (e.g. 1 to 5 includes 1, 1.5, 2, 2.75, 3, 3.8, 4, and 5).

Unless otherwise indicated throughout this specification and the appended embodiments, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following Glossary of defined terms, these definitions shall be applied for the entire application, including the claims:

Glossary

The term "(co)polymer" is used herein to refer to a homocopolymer or a copolymer.

The term "imbibe" is used herein to refer to absorbing liquids.

The term "porous" is used herein to mean a material comprising a network of interconnected pores having a median diameter less than 100 micrometers.

The term "wt %" is used in accordance with its conventional industry meaning and refers to an amount based upon the total weight of solids in the referenced composition.

Materials described herein were found useful for the creation of asymmetric composite articles having a polymeric coating at one surface and into the depth of a substrate. The articles include a polymer coating to provide selectivity, and high flux due to the micropores of the substrate.

As disclosed above, in a first aspect a method is provided, including providing a porous substrate comprising a first major surface, a second major surface opposing the first major surface, and a porous structure extending therebetween; and treating the porous substrate with a plasma treatment or a corona treatment, from the first major surface to a depth of the porous structure between the first major surface and the second major surface. The method further includes applying a coating solution to the treated porous substrate and drying the coating solution to form a composite asymmetric composite article comprising a polymeric coating disposed on the first major surface or on the second major surface and extending into the porous structure to the depth of the treated porous structure.

In a second aspect an article is provided. In particular, an asymmetric composite article including a porous substrate comprising a first major surface, a second major surface opposing the first major surface, and a porous structure extending therebetween; and a polymeric coating disposed on the first major surface or on the second major surface and extending into the porous structure to a depth of the porous structure.

The below description applies to various optional embodiments of either or both of the first aspect and the second aspect.

It has been discovered that it is possible to prepare an article (e.g., a desalination article, gas separator, etc.) that exhibits selectivity and high flux by forming a polymeric coating on a surface or and partially into the depth of the substrate. A number of methods for making a porous substrate are taught in the art. One of the most useful methods involves thermally induced phase separation. Generally such a process is based on the use of a polymer or (co)polymer that is soluble in a diluent at an elevated temperature but that is insoluble in the diluent material at a relatively lower temperature. Examples of such methods are described in U.S. Pat. Nos. 4,539,256, 4,726,989, and 5,120,594; and U.S. Application Publication No. 2011/0244013.

Referring to FIG. 1A, an illustration of the cross-section of an exemplary article 100 is shown. The article 100 includes a porous substrate 10 having a first major surface 12, a second major surface 14 opposing the first major surface 12, and a porous structure 16 extending between the first and second major surfaces (12 and 14, respectively). The first major surface 12 of the porous substrate 10 has undergone treatment by either plasma treatment or corona treatment, into the porous structure 16 to a depth 18.

Plasma treatments and corona treatments are known to the skilled practitioner; for example, U.S. Pat. No. 7,125,603 discloses plasma treatment of porous materials, and U.S. Pat. No. 5,972,176 discloses corona treatment of polymers. The term "plasma treatment" means thin film deposition, surface modification, and any other plasma-induced chemical or physical reaction that can change the wettability of an article. In certain embodiments, treating the porous substrate with a plasma treatment comprises subjecting the porous substrate to plasma at a pressure of from 1 mTorr to 1 Torr, such as from 1 mTorr to 300 mTorr. To make a porous substrate more wettable to a particular coating solution or coating emulsion, one or more gases are included in the plasma selected to modify the surface energy of the porous substrate from the first major surface and into the porous structure towards the second major surface. The type and ratio of the gases included in the plasma affect the resulting surface energy of the treated porous substrate. For instance, Example 6 of U.S. Pat. No. 7,125,603 discloses that a microporous polyethylene membrane having a surface oxygen to silicon ratio of 1.96 after being subjected to a three-step treatment of 1) $O_2$ plasma, 2) tetramethylsilane/$O_2$ plasma, and 3) $O_2$ plasma showed good water flow, whereas a microporous polyethylene membrane having a surface oxygen to silicon ratio of 0.61 after being subjected to a treatment of tetramethylsilane/$O_2$ plasma showed no water flow through the membrane.

It has been discovered that plasma treatment depth from the first major surface of a porous substrate into the porous structure of the substrate can be increased with treatment time, without causing measurable damage to the first major surface of the porous substrate. Suitable treatment times include at least 5 seconds, at least 10 seconds, at least 15 seconds, at least 20 seconds, and up to 20 seconds, up to 30 seconds, up to 40 seconds, up to 50 seconds, up to 60 seconds, up to 80 seconds, up to 100 seconds, or even up to 120 seconds.

The term "corona" refers to electrical discharges that occur at substantially atmospheric pressure, and is to be distinguished from electrical discharges that occur under a vacuum, characterized by an intense, diffuse glow in the space between the anode and cathode, sometimes called "glow" discharge. The corona treatment may be characterized in terms of a "normalized energy", which is calculated from the net power and the velocity of the polymer film being treated in the corona treatment system, according to the following formula: normalized energy=P/wv, where P is the net power (in Watts), w is the corona treatment electrode width (in centimeters), and v is the film velocity (in centimeters per second). Typical units for normalized energy are Joules/square centimeter. In certain embodiments, treating the porous substrate with a corona treatment comprises subjecting the porous substrate to corona discharge having a normalized energy of between about 0.1 and about 100 Joules per square centimeter, such as between about 0.1 and about 20 Joules per square centimeter. It has been discovered that corona treatment depth from the first major surface of a porous substrate into the porous structure of the substrate can be increased with increased normalized energy, without causing measurable damage to the first major surface of the porous substrate.

Suitable depths of treatment into the porous structure of the substrate include at least 0.1 micrometers (μm), at least 0.2 μm, or at least 0.5 μm, and up to 2.0 μm, or up to 3 μm, or up to 5 μm, or up to 10 μm, or up to 15 μm, or up to 20 μm, or up to 25 μm, or even up to 30 μm depth of treatment into the porous structure of the substrate.

Figure 1B:
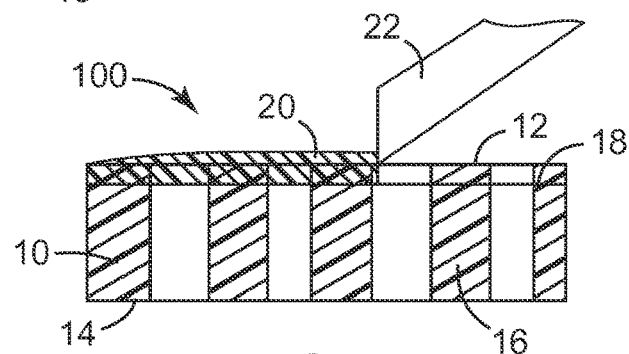
FIG. 1B is a schematic cross-section of an exemplary treated substrate to which a coating is being applied.
Figure 2A:
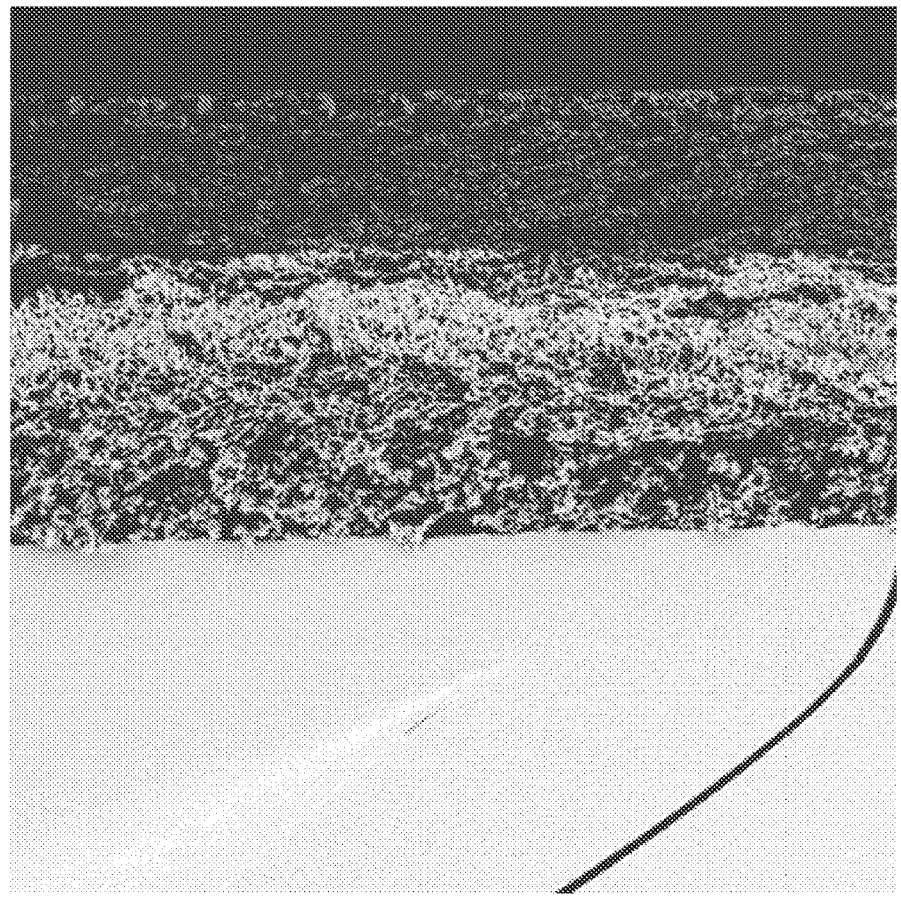
FIG. 2A is a Scanning Electron Microscope (SEM) image of a cross-section of dried polyvinylpyrrolidone (PVP) coating on an untreated polypropylene membrane (Sample 1) at a magnification of 1160 times.
Figure 5D:
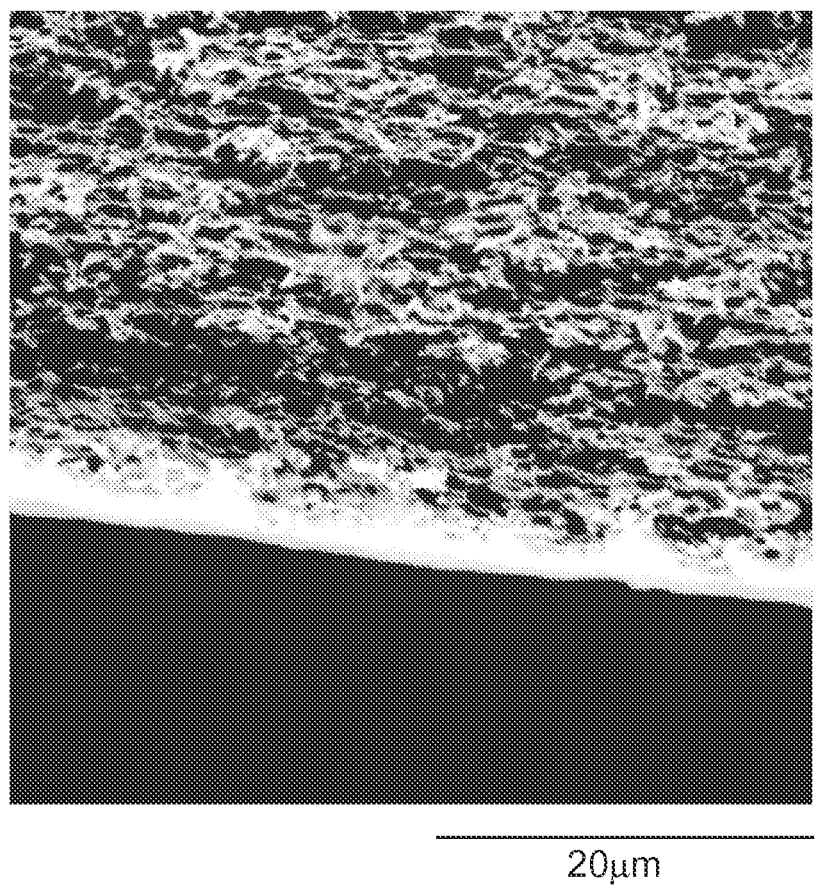
FIG. 5D is an SEM image of a cross-section of dried silicone emulsion coating on a plasma-treated ECTFE membrane (Sample 5) at a magnification of 4700 times.

Referring to FIG. 1B, a coating solution 20 is being applied by an applicator 22 to the first major surface 12 of the porous substrate 10, and the porous substrate 10 imbibes the coating solution 20 to the depth 18 of the treatment into the porous structure 16. A coating solution or coating emulsion is typically applied to the surface of the substrate using conventional techniques such as, for example, bar coating, roll coating, curtain coating, rotogravure coating, knife coating, spray coating, spin coating, dip coating, or slide coating techniques. Coating techniques such as bar coating, roll coating, and knife coating are often used to control the thickness of the coating. As the coating takes place separately from the plasma or corona treatment, the polymer in the coating solution or coating emulsion is not subjected to the plasma or corona treatment.

Following application of a coating solution or coating emulsion, the coating is dried, usually by subjecting the coating to a temperature of 20 degrees Celsius to 250 degrees Celsius. The upper temperature range is generally dictated by the thermal stability of the specific substrate of the composite article. An oven with circulating air or inert gas such as nitrogen is often used for drying purposes. The average (dry) coating depth into the porous structure of the substrate typically matches the depth of the treatment, thus is at least 0.1 micrometers (μm), at least 0.2 μm, or at least 0.5 μm, and up to 2.0 μm, or up to 3 μm, or up to 5 μm, or up to 10 μm, or up to 15 μm, or up to 20 μm, or up to 25 μm, or even up to 30 μm depth into the porous structure of the substrate.

In certain embodiments, the polymeric coating is disposed on the first major surface of the porous substrate, while in other embodiments the polymeric coating is disposed on the second major surface of the porous substrate. The porous substrate is treated from the first major surface to a depth of the porous structure between the first major surface and the second major surface; however, whether the polymeric coating is disposed on the first major surface or on the second major surface will depend on the wetting characteristics of the treated and untreated surfaces to the polymeric coating. For instance, a substrate treated with plasma treatment or corona treatment will have a different surface energy at the first major surface to the treatment depth into the porous substrate, than between the treatment depth and the second major surface. Accordingly, if it is desired to coat a polymer solution or polymer emulsion that is nonwettable to the substrate material on the substrate it will be coated on the treated first major surface, and the substrate will imbibe the polymer solution or polymer emulsion from the first major surface into the porous structure to the depth of the treatment. If it is desired to coat a polymer solution or polymer emulsion that is wettable to the substrate material on the treated substrate, however, it will be coated on the untreated second major surface, and the substrate will imbibe the polymer solution or polymer emulsion from the second major surface into the porous structure to the depth of the treatment.

In many embodiments, the porous substrate comprises a membrane, for instance a membrane having an average pore size at the first major surface of from 50 nm to 10 µm. The porous substrate optionally comprises either a hydrophilic membrane or a hydrophobic membrane. For example and without limitation, the porous substrate may include a membrane comprising a thermoplastic polymer comprising polyethylene, polypropylene, 1-octene, styrene, a polyolefin (co) polymer, polyamide, poly-1-butene, poly-4-methyl-1-pentene, polyether sulfone, ethylene tetrafluoroethylene, polyvinylidene fluoride, polysulfone, polyacrylonitrile, polyamide, cellulose acetate, cellulose nitrate, regenerated cellulose, polyvinyl chloride, polycarbonate, polyethylene terephthalate, polyimide, polytetrafluoroethylene, ethylene chlorotrifluoroethylene, or combinations thereof.

In certain embodiments, the substrates for use in aspects of the present disclosure include Thermally Induced Phase Separation (TIPS) membranes. The pore size of TIPS membranes can be generally controlled due to the ability to select the extent of stretching of the membrane material. TIPS membranes are relatively inexpensive to make, and methods for making them are known to the skilled practitioner. For example, various membranes and methods are described in detail in U.S. Pat. No. 4,726,989 (Mrozinski), U.S. Pat. No. 5,238,623 (Mrozinski), U.S. Pat. No. 5,993,954 (Radovanovic et al.), and U.S. Pat. No. 6,632,850 (Hughes et al.). Substrates for use in aspects of the present disclosure also include Solvent Induced Phase Separated (SIPS) membranes and other microporous membranes made by extrusion, extrusion/stretching and extrusion/stretching/extraction processes, and track etching processes. Suitable substrates that may be formed by SIPS include for example and without limitation polyvinylidene fluoride (PVDF), polyether sulfone (PES), polysulfone (PS), polyacrylonitrile (PAN), nylon (i.e., polyamide), cellulose acetate, cellulose nitrate, regenerated cellulose, and polyimide. Suitable substrates that may be formed by track etching processes include for example and without limitation polycarbonate and polyester. Suitable substrates that may be formed by stretching techniques include for example and without limitation polytetrafluoroethylene (PTFE) and polypropylene.

One suitable polypropylene substrate is commercially available under trade designation F100 0.2 Micron Polypropylene Membrane 20.5×500 Roll TIPS from 3M Company (St. Paul, Minn.). In certain embodiments, as noted above the first microfiltration membrane comprises ethylene chlorotrifluoroethylene (ECTFE). Useful ECTFE membranes may be prepared according to U.S. Pat. No. 4,623,670 (Mutoh et al.), U.S. Pat. No. 4,702,836 (Mutoh et al.), U.S. Pat. No. 6,559,192 (Maccone et al.), U.S. Pat. No. 7,247,238 (Mullette et al.), and PCT Application US2009/067807 (Mrozinski et al.) A suitable ECTFE membrane is commercially available under trade designation PFCO20-ECTFE 0.2UM from 3M Company (St. Paul, Minn.).

The polymer(s) of a polymeric coating are not particularly limited, and typically include any polymer(s) that can be dissolved in or emulsified in water or a water/solvent blend. Useful solvents include for example, isopropyl alcohol, methanol, ethanol, methyl acetate, ethyl acetate, ethylene glycol alkyl ether, acetalaldehyde, acetic acid, acetone, acetonitrile, 1,2-butanediol, 1,3-butanediol, 1,4-butanediol, 2-butoxyethanol, butyric acid, diethanolamine, diethylenetriamine, dimethylformamide, dimethoxyethane, dimethyl sulfoxide, 1,4-dioxane, ethylamine, formic acid, furfuryl alcohol, glycerol, methyl diethanolamine, methyl isocyanide, 1-propanol, 1,3-propanediol, 1,5-pentanediol, propanoic acid, propylene glycol, pyridine, tetrahydrofuran, triethylene glycol, and combinations thereof. Suitable soluble polymers include for instance, polyvinylpyrrolidone, polyethylene glycol, polyethylene oxide, polyvinyl alcohol, polyelectrolytes, poly(N-isopropylacrylamide), polyacrylamides, polyoxazolines, polyethylenimine, poly(acrylic acid), polymethacrylates, maleic anhydrides, polyethers, cellulose, dextran, polycarboxylates, naphthalene sulfonates, or derivatives or copolymers thereof. Suitable emulsifiable polymers include for instance, silicone, silicone derivatives, for example, polydimethyl siloxane, urethane resin, acrylate resin, polyisoprene, polybutadiene, polyamide, polyvinyl chloride, fluoropolymers, styrene butadiene rubber, polyvinyl acetate, polycarbonate, polysulfone, polyether sulfone, polyetherimide, polyimide, polyesters, or a combination thereof. In certain embodiments, the polymeric coating comprises polyvinylpyrrolidone or silicone.

The amount of polymer in a polymer solution or polymer emulsion is not strictly limited, and typically ranges from about 10 wt % to about 70 wt % of the total solution or emulsion, such as at least 10 wt %, at least 15 wt %, at least 20 wt %, at least 25 wt %, or at least 30 wt %, and up to 35 wt %, up to 40 wt %, up to 50 wt %, up to 60 wt %, or up to 70 wt % of the total solution or emulsion. Generally, the amount of polymer in the polymer solution or polymer emulsion is selected to provide a viscosity that is sufficiently low to allow the substrate to imbibe the polymer to the treatment depth, yet is sufficiently high to prevent the substrate from imbibing the coating through the entire thickness of the substrate.

An advantage of including a polymeric coating as part of an asymmetric composite article is that the coating provides greater selectivity than the substrate of the article. In certain embodiments, the polymeric coating is selective for organic solutes in aqueous mixtures, or metal ions from aqueous mixtures. Similarly, in certain embodiments, the polymeric coating is selective for carbon dioxide in a gas mixture.

Exemplary Embodiments

Embodiment 1 is a method for making an asymmetric composite article including providing a porous substrate comprising a first major surface, a second major surface opposing the first major surface, and a porous structure extending therebetween; and treating the porous substrate with a plasma treatment or a corona treatment, from the first major surface to a depth of the porous structure between the first major surface and the second major surface. The method further includes applying a coating solution to the treated porous substrate and drying the coating solution to form a composite asymmetric composite article comprising a polymeric coating disposed on the first major surface or on the second major surface and extending into the porous structure to the depth of the treated porous structure.

Embodiment 2 is a method of embodiment 1, wherein the polymeric coating is disposed on the first major surface of the treated porous substrate.

Embodiment 3 is a method of embodiment 1, wherein the polymeric coating is disposed on the second major surface of the treated porous substrate.

Embodiment 4 is a method of embodiment 1, comprising treating the porous substrate with a plasma treatment.

Embodiment 5 is a method of embodiment 1, comprising treating the porous substrate with a corona treatment.

Embodiment 6 is a method of any of embodiments 1 through 5, wherein the porous substrate comprises a membrane.

Embodiment 7 is a method of embodiment 6, wherein the porous substrate comprises a membrane comprising an average pore size at the first major surface of from 50 nm to 10 µm.

Embodiment 8 is a method of embodiment 6 or embodiment 7, wherein the porous substrate comprises a hydrophilic membrane.

Embodiment 9 is a method of embodiment 6 or embodiment 7, wherein the porous substrate comprises a hydrophobic membrane.

Embodiment 10 is a method of embodiment 6 or embodiment 7, wherein the porous substrate comprises a membrane comprising a thermoplastic polymer comprising polyethylene, polypropylene, 1-octene, styrene, a polyolefin (co) polymer, polyamide, poly-1-butene, poly-4-methyl-1-pentene, polyether sulfone, ethylene tetrafluoroethylene, polyvinylidene fluoride, polysulfone, polyacrylonitrile, polyamide, cellulose acetate, cellulose nitrate, regenerated cellulose, polyvinyl chloride, fluoropolymers, styrene butadiene rubber, polyvinyl acetate, polycarbonate, polyethylene terephthalate, polyimide, polytetrafluoroethylene, ethylene chlorotrifluoroethylene, or combinations thereof.

Embodiment 11 is a method of any of embodiments 1 through 4 or 6 through 10, comprising treating the porous substrate with a plasma treatment comprising subjecting the porous substrate to plasma at a pressure of from 1 mTorr to 1.0 Torr.

Embodiment 12 is a method of embodiment 11, wherein the plasma treatment comprises subjecting the porous substrate to plasma at a pressure of from 1 mTorr to 300 mTorr.

Embodiment 13 is a method of any of embodiments 1 through 3 or 5 through 10, comprising treating the porous substrate with a corona treatment comprising subjecting the porous substrate to corona discharge having a normalized energy of between about 0.1 and about 100 Joules per square centimeter.

Embodiment 14 is a method of embodiment 13, wherein the corona treatment comprises subjecting the porous substrate to corona discharge having a normalized energy of between about 0.1 and about 20 Joules per square centimeter.

Embodiment 15 is a method of any of embodiments 1 through 14, wherein the treating of the porous substrate with a plasma treatment or a corona treatment treats the porous substrate to a depth of up to 30.0 µm from the first major surface.

Embodiment 16 is a method of any of embodiments 1 through 15, wherein the treating of the porous substrate with a plasma treatment or a corona treatment treats the porous substrate to a depth of up to 5.0 µm from the first major surface.

Embodiment 17 is a method of any of embodiments 1 through 16, wherein the treating of the porous substrate with a plasma treatment or a corona treatment treats the porous substrate to a depth of up to 3.0 µm from the first major surface.

Embodiment 18 is a method of any of embodiments 1 through 17, wherein the treating of the porous substrate with a plasma treatment or a corona treatment treats the porous substrate to a depth of up to 2.0 µm from the first major surface.

Embodiment 19 is a method of any of embodiments 1 through 18, wherein the treating of the porous substrate with a plasma treatment or a corona treatment treats the porous substrate to a depth of at least 0.1 µm from the first major surface.

Embodiment 20 is a method of any of embodiments 1 through 19, wherein the coating solution comprises a polymer solution or polymer emulsion in water or solvent or a water/solvent blend.

Embodiment 21 is a method of any of embodiments 1 through 20, wherein the coating solution comprises a polymer solution comprising polyvinylpyrrolidone, polyethylene glycol, polyethylene oxide, polyvinyl alcohol, polyelectrolytes, poly(N-isopropylacrylamide), polyacrylamides, polyoxazolines, polyethylenimine, poly(acrylic acid), polymethacrylates, maleic anhydrides, polyethers, cellulose, dextran, polycarboxylates, naphthalene sulfonates, or derivatives or (co)polymers thereof.

Embodiment 22 is a method of any of embodiments 1 through 20, wherein the coating solution comprises a polymer emulsion comprising silicone, silicone derivatives, urethane resin, acrylate resin, polyisoprene, polybutadiene, polyamide, polyvinyl chloride, fluoropolymers, styrene butadiene rubber, polyvinyl acetate, polycarbonate, polysulfone, polyether sulfone, polyetherimide, polyimide, polyesters, or a combination thereof.

Embodiment 23 is a method of any of embodiments 1 through 21, wherein the coating solution comprises polyvinylpyrrolidone or silicone.

Embodiment 24 is a method of any of embodiments 1 through 23, wherein the drying comprises subjecting the coating to a temperature of 20 degrees Celsius to 250 degrees Celsius.

Embodiment 25 is a method of any of embodiments 1 through 24, wherein the polymeric coating is selective for organic solutes in an aqueous mixture.

Embodiment 26 is a method of any of embodiments 1 through 24, wherein the polymeric coating is selective for carbon dioxide in a gas mixture.

Embodiment 27 is an asymmetric composite article including a porous substrate comprising a first major surface, a second major surface opposing the first major surface, and a porous structure extending therebetween; and a polymeric coating disposed on the first major surface or on the second major surface and extending into the porous structure to a depth of the porous structure.

Embodiment 28 is a composite article of embodiment 27, wherein the polymeric coating is disposed on the first major surface of the porous substrate.

Embodiment 29 is a composite article of embodiment 27, wherein the polymeric coating is disposed on the second major surface of the porous substrate.

Embodiment 30 is a composite article of any of embodiments 27 through 29, wherein the porous substrate comprises a membrane.

Embodiment 31 is a composite article of embodiment 30, wherein the porous substrate comprises a membrane comprising an average pore size at the first major surface of from 50 nm to 10 μm.

Embodiment 32 is a composite article of embodiment 30 or embodiment 31, wherein the porous substrate comprises a hydrophilic membrane.

Embodiment 33 is a composite article of embodiment 30 or embodiment 31, wherein the porous substrate comprises a hydrophobic membrane.

Embodiment 34 is a composite article of embodiment 32 or embodiment 33, wherein the porous substrate comprises a membrane comprising a thermoplastic polymer comprising polyethylene, polypropylene, 1-octene, styrene, a polyolefin (co)polymer, polyamide, poly-1-butene, poly-4-methyl-1-pentene, polyether sulfone, ethylene tetrafluoroethylene, polyvinylidene fluoride, polysulfone, polyacrylonitrile, polyamide, cellulose acetate, cellulose nitrate, regenerated cellulose, polyvinyl chloride, polycarbonate, polyethylene terephthalate, polyimide, polytetrafluoroethylene, ethylene chlorotrifluoroethylene, or combinations thereof.

Embodiment 35 is a composite article of any of embodiments 27 through 34, wherein the depth comprises a depth of up to 30.0 μm from the first major surface.

Embodiment 36 is a composite article of any of embodiments 27 through 35, wherein the depth comprises a depth of up to 5.0 μm from the first major surface.

Embodiment 37 is a composite article of any of embodiments 27 through 36, wherein the depth comprises a depth of up to 3.0 μm from the first major surface.

Embodiment 38 is a composite article of any of embodiments 27 through 37, wherein the depth comprises a depth of up to 2.0 μm from the first major surface.

Embodiment 39 is a composite article of any of embodiments 27 through 38, wherein the depth comprises a depth of at least 0.1 μm from the first major surface.

Embodiment 40 is a composite article of any of embodiments 27 through 39, wherein the polymeric coating comprises polyvinylpyrrolidone, polyethylene glycol, polyethylene oxide, polyvinyl alcohol, polyelectrolytes, poly(N-isopropylacrylamide), polyacrylamides, polyoxazolines, polyethylenimine, poly(acrylic acid), polymethacrylates, maleic anhydrides, polyethers, cellulose, dextran, polycarboxylates, naphthalene sulfonates, or derivatives or (co) polymers thereof.

Embodiment 41 is a composite article of any of embodiments 27 through 39, wherein the polymeric coating comprises silicone, silicone derivatives, urethane resin, acrylate resin, polyisoprene, polybutadiene, polyamide, polyvinyl chloride, fluoropolymers, styrene butadiene rubber, polyvinyl acetate, polycarbonate, polysulfone, polyether sulfone, polyetherimide, polyimide, polyesters, or a combination thereof.

Embodiment 42 is a composite article of any of embodiments 27 through 40, wherein the polymeric coating comprises polyvinylpyrrolidone or silicone.

Embodiment 43 is a composite article of any of embodiments 27 through 42, wherein the polymeric coating is selective for organic solutes in an aqueous mixture.

Embodiment 44 is a composite article of any of embodiments 27 through 43, wherein the polymeric coating is selective for carbon dioxide in a gas mixture.

Exemplary embodiments of the present disclosure have been described above and are further illustrated below by way of the following Examples, which are not to be construed in any way as imposing limitations upon the scope of the present disclosure. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims.

EXAMPLES

The following examples are intended to illustrate exemplary embodiments within the scope of this disclosure. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Materials

The following terminology, abbreviations, and trade names of materials are used in the Examples:

Polyvinylpyrrolidone (PVP) A14315 with molecular weight 58 k was purchased from Alfa Aesar (Ward Hill, Mass.).

Pre-cured silicone elastomer emulsion in water, 84 Additive, was acquired from Dow Corning (Midland, Mich.).

Isopropanol (IPA) was purchased from VWR International (1310 Goshen Parkway, West Chester, Pa. 19380).

MilliQ-grade water from a MilliQ Gradient A 10 system (EMD Millipore) was used for MWCO and flux testing.

A polypropylene (PP) TIPS membrane, 3M F100 0.2 μm grade, was obtained from 3M Company (St. Paul, Minn.).

An ethylene chlorotrifluoroethylene (ECTFE) membrane, 3M P1100 PFCO20 0.2 μm grade, was obtained from 3M Company (St. Paul, Minn.).

Treatment Procedures

The following substrate treatment methods were used to treat substrates according to the present disclosure.

1) Plasma Treatment

For the static treatment process, the substrate was placed on the powered electrode of a batch plasma apparatus. The system has a nominal base pressure of 5 mTorr. The static treatment process was performed by flowing a 2% silane gas (in argon) at a flow rate of 1000 standard $cm^3$/min along with oxygen gas at a flow rate of 200 standard $cm^3$/min, with a plasma power of 300 watts for 20 or 40 seconds.

For the continuous treatment process, the substrate was placed on the powered electrode of a roll-to-roll plasma apparatus. The continuous plasma treatment apparatus was performed by flowing a 2% silane gas (in argon) at a flow rate of 2000 standard $cm^3$/min along with oxygen gas at a flow rate of 200 standard $cm^3$/min, with a plasma power of 1000 watts for a residence time of 60 seconds. The pressure during the plasma treatment was 223 mTorr.

2) Corona Treatment

Samples were treated in a Pillar Technologies "Universal" corona treater with 600 Watts of power applied to two 13-inch wide bare-metal "shoe" electrodes over a ceramic-covered backing roll. Samples were taped onto a 2-mil polypropylene carrier film and transported through the corona discharge at 22 meters per minute (for the 0.5 J/cm² treatment) or at 11 meters per minute (for the 1.0 J/cm² treatment).

Characterization

The following characterization methods were used to evaluate substrate treatments and asymmetric composite articles prepared according to the present disclosure.

1) Treatment Depth Evaluation

A polyvinylpyrrolidone (PVP) solution was prepared at 10 or 15 wt % in water with 10-20 vol % IPA. Treatment depth was evaluated by applying an excess of the PVP solution to the substrate surface and allowing the solution to dry before cryogenic fracture and cross-sectional analysis of the coated membrane by scanning electron microscopy.

2) Coating Evaluation

An 84 Additive silicone emulsion was diluted to 30% solids in water before coating onto the substrate surface with a No. 5 wire-wound rod. After the coating was dried, the coated membrane was cryogenically fractured for cross-sectional analysis by scanning electron microscopy.

3) Scanning Electron Microscope (SEM) images

A portion of each sample was cut out and mounted on an SEM stub for examination of the surfaces. Cross-sections were made by cryogenic fracturing. A thin layer of gold was sputter coated on the samples to make them conductive. SEM instrument conditions included accelerating voltage of 5.0 KV and 2-11.5 mm working distance (wd). Images were taken at magnifications ranging from 280× to 5000× using a FEI Phenom SEM.

Example #1 Plasma Treatment of Substrates

The plasma treatment times and resulting treatment depths are listed in Table 1 below. For both the PP and ECTFE membranes without plasma treatment, a very sharp boundary was seen between the PVP coating and the membrane material, with no appearance of PVP infiltration into the membrane pores. Following plasma treatment, infiltration of PVP was seen for all samples. The treatment depth was an order of magnitude greater in the PP membranes than the ECTFE membranes (e.g., 20 µm after 20 seconds of treatment of a PP membrane compared to 1.5 µm for the same treatment time for an ECTFE membrane.) Finally, the treatment depth increased with treatment time in both membranes, reaching a depth of 30 µm for the 40 second treated PP membrane and about 3.0 µm for the 60 second treated ECTFE membrane.

TABLE 1

| Sample No. | Substrate | Treatment Type | Treatment Time (s) | Treatment Depth* (µm) |
|---|---|---|---|---|
| 1 | PP membrane | None | — | 0 |
| 2 | PP membrane | Static | 20 | 20 |
| 3 | PP membrane | Static | 40 | 30 |
| 4 | ECTFE membrane | None | — | 0 |
| 5 | ECTFE membrane | Static | 20 | 1.5 |
| 6 | ECTFE membrane | Static | 40 | 2.5 |
| 7 | ECTFE membrane | Continuous | 60 | 3.0 |

*Based on PVP coating infiltration depth in cross-sectional SEM evaluation.

Example #2 Corona Treatment of Substrates

The corona treatment conditions applied to different membrane substrates are listed in Table 2 below. The control cases (Samples 1 and 5) were discussed above in Example #1, with no appearance of PVP infiltration into the membrane pores. Following corona treatment, infiltration of PVP was seen extending to about 3.5 µm in the PP membrane case. The treatment depth was lower in the ECTFE membrane cases. After 0.5 J/cm² corona treatment, there appeared to be some slight infiltration of the PVP into the membrane to about 1 µm. The quantification is approximate due to the coating being on the order of the membrane surface roughness. After 1.0 J/cm² corona treatment, the infiltration depth increased to about 1.5 µm.

TABLE 2

| Sample No. | Substrate | Treatment Level (J/cm²) | Treatment Depth* (um) |
|---|---|---|---|
| 8 | PP membrane | 0.5 | 3.5 |
| 9 | ECTFE membrane | 0.5 | ~1 |
| 10 | ECTFE membrane | 1.0 | 1.5 |

*Based on PVP coating infiltration depth in cross-sectional SEM evaluation.

Example #3 Coating Onto Treated Substrates

A subset of the membrane samples was evaluated by coating with a pre-cured silicone elastomer emulsion. For the untreated PP membrane (Sample 1), the overall coating thickness was about 2.5-3.0 µm and the coating did not appear to penetrate beyond the surface of the porous substrate. For Sample 2, in which the PP membrane had been treated for 20 seconds, the coating material was seen to be distributed over the first 15 µm of the membrane due to the treatment depth having extended beyond the inherent coating thickness. These observations reflect the treatment depth results measured using PVP.

For the untreated ECTFE membrane case (Sample 4), the coating thickness was about 3-4 µm and the coating did not appear to penetrate beyond the surface of the porous substrate. For Sample 5, in which the ECTFE membrane had been treated for 20 seconds, the resulting coating is half-embedded into the substrate. This result reflects the treatment depth results measured using PVP.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. Furthermore, all publications, published patent applications and issued patents referenced herein are incorporated by reference in their entirety to the same extent as if each individual publication or patent was specifically and individually indicated to be incorporated by reference. Various exemplary embodiments have been described. These and other embodiments are within the scope of the listing of disclosed embodiments.

The invention claimed is:

1. A method of making an asymmetric composite article comprising:

providing a porous substrate comprising a first major surface, a second major surface opposing the first major surface, and a porous structure extending therebetween, wherein the porous substrate comprises polypropylene membrane or an ethylene chlorotrifluoroethylene membrane;

treating the porous substrate with a plasma treatment or a corona treatment, from the first major surface to a depth of the porous structure between the first major surface and the second major surface, wherein the depth comprises a depth of at least 0.5 μm from the first major surface and up to 30 μm from the first major surface;

applying a coating solution to the treated porous substrate, wherein the coating solution comprises a polymer solution or a polymer emulsion in water or solvent or a water/solvent blend; and drying the coating solution to form a composite asymmetric composite article comprising a polymeric coating disposed on the first major surface or on the second major surface and extending into the porous structure to the depth of the treated porous structure.

2. The method of claim 1, comprising treating the porous substrate with a plasma treatment.

3. The method of claim 1, comprising treating the porous substrate with a corona treatment.

4. The method of claim 1, wherein the porous substrate comprises a polypropylene membrane.

5. The method of claim 1, wherein the treating of the porous substrate with a plasma treatment or a corona treatment treats the porous substrate to a depth of at least 3 μm from the first major surface and up to 30.0 μm from the first major surface.

6. The method of claim 1, wherein the coating solution comprises a polymer solution comprising polyvinylpyrrolidone, polyethylene glycol, polyethylene oxide, polyvinyl alcohol, polyelectrolytes, poly(N-isopropylacrylamide), polyacrylamides, polyoxazolines, polyethylenimine, poly(acrylic acid), polymethacrylates, maleic anhydrides, polyethers, cellulose, dextran, polycarboxylates, naphthalene sulfonates, or derivatives or (co)polymers thereof.

7. The method of claim 1, wherein the coating solution comprises a polymer emulsion comprising silicone, silicone derivatives, urethane resin, acrylate resin, polyisoprene, polybutadiene, polyamide, polyvinyl chloride, fluoropolymers, styrene butadiene rubber, polyvinyl acetate, polycarbonate, polysulfone, polyether sulfone, polyetherimide, polyimide, polyesters, or a combination thereof.

8. The method of claim 1, wherein the polymeric coating is disposed on the second major surface of the treated porous substrate.

* * * * *

UNITED STATES PATENT AND TRADEMARK OFFICE
CERTIFICATE OF CORRECTION

PATENT NO. : 10,807,046 B2
APPLICATION NO. : 15/319111
DATED : October 20, 2020
INVENTOR(S) : Michelle Mok et al.

It is certified that error appears in the above-identified patent and that said Letters Patent is hereby corrected as shown below:

On the Title Page

Page 2, Column 2:
Line 21, under "Other Publications", delete "http:" and insert -- https: --, therefor.
Line 26, under "Other Publications", delete "http:" and insert -- https: --, therefor.
Line 29, under "Other Publications", delete "/lp2b.qB.f7IAAAFM20p88eJt.nav," and insert -- /lp2b.qB.f7IAAAFM20p88eJt,nav, --, therefor.

Signed and Sealed this
Eighth Day of December, 2020

Andrei Iancu
*Director of the United States Patent and Trademark Office*